US012489215B2

(12) United States Patent
Chen

(10) Patent No.: US 12,489,215 B2
(45) Date of Patent: Dec. 2, 2025

(54) GAIN ANTENNA AND COMMUNICATION DEVICE

(71) Applicant: RUIJIE NETWORKS CO., LTD., Fuzhou (CN)

(72) Inventor: Yanjun Chen, Fuzhou (CN)

(73) Assignee: RUIJIE NETWORKS CO., LTD., Fuzhou (CN)

( * ) Notice: Subject to any disclaimer, the term of this patent is extended or adjusted under 35 U.S.C. 154(b) by 0 days.

(21) Appl. No.: 19/217,282

(22) Filed: May 23, 2025

(65) Prior Publication Data

US 2025/0286283 A1 Sep. 11, 2025

Related U.S. Application Data

(63) Continuation of application No. PCT/CN2024/110846, filed on Aug. 8, 2024.

(30) Foreign Application Priority Data

Dec. 19, 2023 (CN) ........................ 202311755880.9

(51) Int. Cl.
*H01Q 13/18* (2006.01)
*H01Q 9/04* (2006.01)

(52) U.S. Cl.
CPC ........... *H01Q 13/18* (2013.01); *H01Q 9/0485* (2013.01)

(58) Field of Classification Search
CPC ...... H01Q 13/18; H01Q 9/0485; H01Q 1/241; H01Q 1/242; H01Q 1/243
See application file for complete search history.

(56) References Cited

U.S. PATENT DOCUMENTS 10,431,896 B2 * 10/2019 Boryssenko ........... H01Q 13/18
2015/0171522 A1 * 6/2015 Liu ........................ H01Q 21/20
343/817
2017/0256863 A1 * 9/2017 Jan ......................... H01Q 9/285

FOREIGN PATENT DOCUMENTS

| | | | |
|---|---|---|---|
| CN | 112310630 | A | 2/2021 |
| CN | 106450715 | A | 10/2021 |
| CN | 113555666 | A | 10/2021 |
| CN | 114243280 | A | 3/2022 |
| WO | WO2019062445 | * | 4/2019 |
| WO | 2023103244 | A1 | 6/2023 |

OTHER PUBLICATIONS

International Search Report and Written Opinion issued on Nov. 8, 2024, in corresponding International Application No. PCT/CN2024/110846, 14 pages.

* cited by examiner

*Primary Examiner* — Awat M Salih
(74) *Attorney, Agent, or Firm* — Maier & Maier, PLC

(57) ABSTRACT

A gain antenna and a communication device. The gain antenna includes a feed source, a reflector, a dielectric director, and a metal director, where the feed source includes a first radiation unit and a second radiation unit, the first radiation unit and the second radiation unit are arranged in a crossed manner; the dielectric director includes a cavity structure, the feed source and the reflector are disposed inside the cavity structure, and the intersection line of the feed source is an intersection line formed by the first radiation unit and the second radiation unit arranged in the crossed manner; and the metal director includes a plurality of metal units, and the plurality of metal units are disposed on an inner surface of the cavity structure and peripherally arranged around an axis of the cavity structure.

19 Claims, 10 Drawing Sheets

| Name | Angle | Phase | Gain |
|---|---|---|---|
| m1 | 90 | 90.0000 | -0.9008 |
| m2 | -90 | -90.0000 | -0.8781 |
| m3 | 90 | 90.0000 | 1.3732 |
| m4 | -90 | -90.0000 | 1.7173 |
| m5 | 0 | 4.9738E-13 | -13.6182 |
| m6 | 0 | 4.9738E-13 | -6.9853 |

| Name | Angle | Phase | Gain |
|---|---|---|---|
| m1 | 90 | 90.0000 | 3.8177 |
| m2 | -90 | -90.0000 | 3.8918 |
| m3 | 90 | 90.0000 | 1.3732 |
| m4 | -90 | -90.0000 | 1.7173 |

| Name | Angle | Phase | Gain |
|---|---|---|---|
| m1 | 90 | 90.0000 | 1.8958 |
| m2 | 90 | 90.0000 | 6.9837 |
| m3 | -90 | -90.0000 | 1.9931 |
| m4 | -90 | -90.0000 | 5.8074 |

GAIN ANTENNA AND COMMUNICATION DEVICE

CROSS-REFERENCE TO RELATED APPLICATIONS

This application is a continuation of International Application No. PCT/CN2024/110846, filed on Aug. 8, 2024, which claims priority to Chinese Patent Application No. 202311755880.9, filed with the China National Intellectual Property Administration on Dec. 19, 2023 and entitled "GAIN ANTENNA AND COMMUNICATION DEVICE", which are incorporated herein by reference in their entireties.

TECHNICAL FIELD

This application relates to the field of wireless communication, and in particular, to a gain antenna and a communication device.

BACKGROUND

With the continuous development of wireless communication products, wireless signals are becoming increasingly complex. When an antenna is used as a signal transceiving module of a wireless device, the performance of an antenna determines the quality of the device. Increasing antenna gain within a limited volume to increase a coverage distance of the device is a valuable research direction.

SUMMARY

Embodiments of this application disclose a gain antenna and a communication device, where addition of a metal director and a dielectric director improves antenna radiation impedance and increases antenna gain.

Embodiments of this application provide the following technical solution:

A gain antenna includes: a feed source, a reflector, a dielectric director, and a metal director; where

- the feed source includes a first radiation unit and a second radiation unit, and the first radiation unit and the second radiation unit are arranged in a crossed manner;
- the dielectric director includes a cavity structure, the feed source and the reflector are disposed inside the cavity structure, an axial direction of the cavity structure coincides with an intersection line of the feed source, and the intersection line of the feed source is an intersection line formed by the first radiation unit and the second radiation unit arranged in the crossed manner;
- the metal director includes a plurality of metal units, and the plurality of metal units are disposed on an inner surface of the cavity structure and peripherally arranged around an axis of the cavity structure; and in some embodiments, the dielectric director is a cylindrical structure, the feed source and the reflector are disposed inside the cylindrical structure, and an axial direction of the cylindrical structure coincides with the intersection line; and
- the plurality of metal units of the metal director are disposed on an inner surface of the cylindrical structure and peripherally arranged around an axis of the cylindrical structure.

The gain antenna, based on the feed source and the reflector, is provided with the metal director nested with the dielectric director. Specifically, electromagnetic waves emitted by the antenna are reflected from the reflector to form a highly directional beam, initially increasing antenna gain. Then, the beam is refracted through the metal director and the dielectric director to further form electromagnetic waves with high gain, achieving the goals of improving antenna impedance and increasing antenna gain. The dielectric director in this solution has low cost, is easy to integrate and convenient to process, and facilitates combination with a product, thereby increasing a product coverage distance. This addresses the issues of large volume, high weight, high cost, inconvenient integration with a device, and complex installation in engineering applications of the antenna caused by the need to improve performance of the radiation units of the antenna.

In some embodiments, the reflector includes a first plate, a second plate, and a connecting plate, where the first plate and the second plate are arranged in parallel and connected to each other through the connecting plate, and the connecting plate is perpendicular to the intersection line of the first radiation unit and the second radiation unit. The reflector is configured to reflect electromagnetic waves emitted by the antenna to form a highly directional beam, increasing antenna gain.

In some embodiments, each metal unit includes a plurality of metal plates, and the plurality of metal plates are arranged in parallel along the axial direction of the cylindrical structure. Uniform arrangement of the plurality of metal plates facilitates refraction of electromagnetic waves in various directions, increasing antenna gain.

In some embodiments, the metal plates are elongated structures.

In some embodiments, the first radiation unit and the second radiation unit intersect to form an included angle, the included angle includes a first included angle, and a magnitude of the first included angle ranges from 85° to 95°. The included angle between the first radiation unit and the second radiation unit can be adjusted based on actual application conditions to achieve a better gain effect.

In some embodiments, a dimension of the connecting plate is 2.6 cm*2.6 cm;

- and/or, a dimension of the first plate along an axial direction of the dielectric director ranges from 0.5 cm to 1 cm;
- and/or, a dimension of the second plate along an axial direction of the dielectric director ranges from 0.5 cm to 1 cm. Dimensions of the reflector can be adjusted based on actual conditions to meet application requirements.

In some embodiments, a dielectric constant of the metal director is a first fixed value, and a dielectric constant of the dielectric director is a second fixed value. The metal director and the dielectric director with the fixed dielectric constants are used, so that the processing technology is simple, and the material molding stability is good.

In some embodiments, a distance from a geometric center of the feed source to an inner surface of the dielectric director along a direction perpendicular to the axis of the cylindrical structure ranges from 0.2λ to 2.8λ, where λ=1/f, and f is a frequency of the gain antenna;

- and/or, a thickness of the dielectric director ranges from 0.29λ to 0.3λ, where λ=1/f, and f is a frequency of the gain antenna.

In some embodiments, a distance from the geometric center of the feed source to an outer surface of the dielectric director along the direction perpendicular to the axis of the cylindrical structure ranges from 0.49λ to 3.1λ, where λ=1/f, and f is the frequency of the gain antenna.

In some embodiments, a cross-sectional shape of the dielectric director is circular.

In some embodiments, an outer surface of the dielectric director is provided with a plurality of microstrip structures in different sizes.

In some embodiments, a height of the dielectric director along the axial direction is greater than a height of the feed source along the axial direction. Positional parameters of the feed source and the dielectric director, as well as their respective dimensional parameters, can be adjusted based on actual conditions to maximize the gain effect. In some embodiments, a cross-sectional shape of the dielectric director is square, and the cavity structure of the dielectric director is a cubic structure.

In some embodiments, an outer surface of the dielectric director is provided with a plurality of split-ring resonator structures.

In some embodiments, a spacing between two adjacent split-ring resonator structures is equal to one another. A dielectric director with a periodic structure can achieve conversion of electromagnetic waves over a short distance, increasing antenna gain and featuring low design cost and wide application range.

In some embodiments, a cross-sectional shape of the dielectric director is circular.

In some embodiments, an outer surface of the dielectric director is provided with a plurality of microstrip structures in different sizes. The microstrip structures in different sizes can achieve different phase shifts in electromagnetic waves, increasing gain through phase compensation.

In some embodiments, the dielectric director and the metal director form a director assembly.

In some embodiments, the gain antenna includes a plurality of director assemblies, and the plurality of director assemblies are arranged at intervals along a direction perpendicular to an axis of the dielectric director. Using the director assemblies as independent expansion units in a stacked manner can further increase antenna gain.

In some embodiments, a spacing between two adjacent director assemblies along the direction perpendicular to the axis of the dielectric director is equal to one another. Controlling the spacing between the director assemblies can increase antenna gain.

Embodiments of this application further provide a communication device including the gain antenna. The communication device includes all beneficial effects of the gain antenna, which are not repeated here.

BRIEF DESCRIPTION OF DRAWINGS

To more clearly illustrate technical solutions in embodiments of the present invention or in the conventional technology, the following briefly describes the accompanying drawings required for describing the embodiments or the conventional technology. Apparently, the accompanying drawings in the following descriptions show merely some embodiments of this application, and persons of ordinary skill in the art may still derive other drawings from the accompanying drawings without creative efforts.

Figure 1:
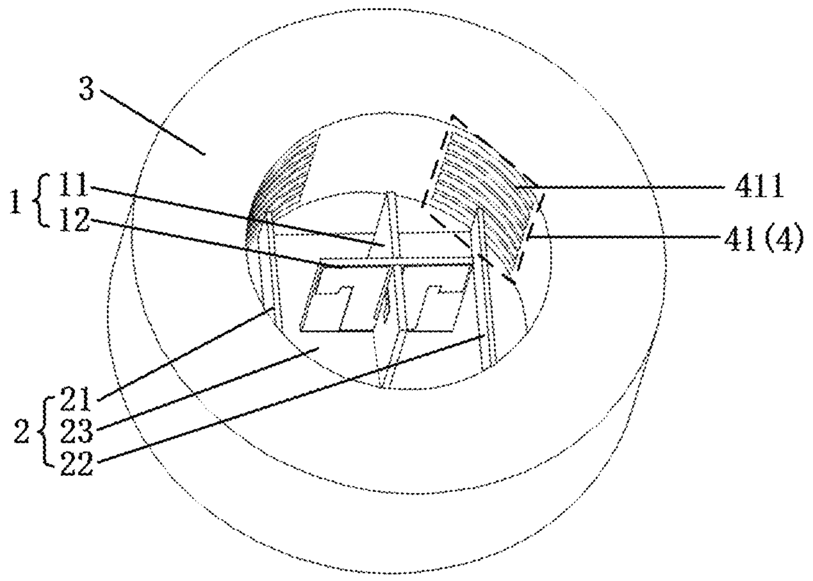
FIG. 1 is a schematic structural diagram of a gain antenna according to an embodiment of this application.
Figure 2:
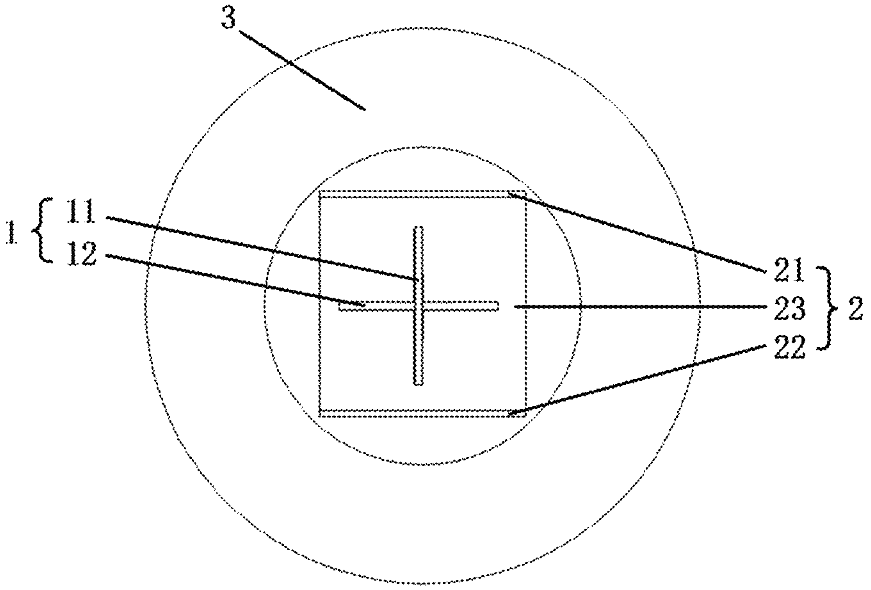
FIG. 2 is a schematic structural top view of a gain antenna according to an embodiment of this application.

Reference signs: 1. feed source; 2. reflector; 3. dielectric director; 4. metal director; 5. director assembly; 11. first radiation unit; 12. second radiation unit; 21. first plate; 22. second plate; 23. connecting plate; 31. split-ring resonator structure; 32. microstrip structure; 41. metal unit; and 411. metal plate.

DETAILED DESCRIPTION OF EMBODIMENTS

The following clearly and thoroughly describes the technical solutions in embodiments of this application with reference to the accompanying drawings in the embodiments of this application. Apparently, the described embodiments are only some rather than all embodiments of this application. All other embodiments obtained by persons of ordinary skill in the art based on these embodiments of this application without creative efforts shall fall within the protection scope of this application. In the description of the embodiments of this application, unless otherwise specified, "/" means "or", for example, A/B may mean A or B; "and/or" in this specification is only an associative relationship for describing associated objects, indicating that three relationships may be present. For example, A and/or B may indicate the following three cases: presence of only A, presence of both A and B, and presence of only B. Additionally, in the description of the embodiments of this application, "a plurality of" means two or more.

Hereinafter, the terms "first" and "second" are merely for the purpose of description, and shall not be understood as any indication or implication of relative importance or any implicit indication of the number of technical features indicated. Therefore, a feature limited by "first" or "second" may explicitly or implicitly include one or more such features. In the description of the embodiments of this application, unless otherwise specified, "a plurality of" means two or more.

With increased antenna gain, for achieving a same signal coverage effect, the number of products required in a coverage area may be reduced, achieving the value of energy saving and efficiency enhancement. Currently, the solutions to achieve high-gain antennas mainly include the following solutions: (1) A solution is solely relied on stacking of antenna radiation elements, where theoretically, as the number of antenna radiation elements doubles, the gain can be significantly increased, but as the number of antenna radiation elements increases, the size of the antenna also increases, and a feed network becomes more complex.

Whether series feed or parallel feed is used, link loss increases to some extent, affecting antenna efficiency. (2) A parabolic metal reflector is added underneath the antenna radiation elements, so that electromagnetic waves emitted by the antenna radiation elements are reflected from the parabolic metal reflector, forming a highly directional beam, achieving high gain. Typical examples include horn antennas or parabolic antennas. Although such antennas can achieve high gain, their large volumes limit their use in many application scenarios. (3) With the use of wave-particle duality of electromagnetic waves, materials with different dielectric constants are added at appropriate positions of the antenna radiation elements; and with the use of the gradient of dielectric constants of the materials, electromagnetic waves are refracted in the materials with different dielectric constants to form electromagnetic waves with a narrow beam and high gain. Due to limitations in processing technology and material molding stability, this solution is difficult to achieve cost-effective industrialization based on the existing technology and materials. Therefore, such antennas have not yet reached conditions for large-scale mass production, and they have large volumes and high costs.

As shown in FIG. 1 to FIG. 9, embodiments of this application provide a gain antenna including:

- a feed source 1 including a first radiation unit 11 and a second radiation unit 12, where the first radiation unit 11 and the second radiation unit 12 are arranged in a crossed manner;
- a reflector 2;
- a dielectric director 3, where the dielectric director 3 includes a cavity structure, the feed source 1 and the reflector 2 are disposed inside the cavity structure, an axial direction of the cavity structure coincides with an intersection line of the feed source 1, and the intersection line of the feed source 1 refers to an intersection line formed by the first radiation unit 11 and the second radiation unit 12 arranged in the crossed manner; and
- a metal director 4 including a plurality of metal units 41, where the plurality of metal units 41 are disposed on an inner surface of the cavity structure and peripherally arranged around an axis of the cavity structure.

In a possible implementation, referring to FIG. 1, the dielectric director 3 includes a cylindrical structure, the feed source 1 and the reflector 2 are disposed inside the cylindrical structure, and an axial direction of the cylindrical structure coincides with an intersection line of the feed source 1; and

- the metal director 4 includes a plurality of metal units 41, and the plurality of metal units 41 are disposed on an inner surface of the cylindrical structure and peripherally arranged around an axis of the cylindrical structure.

The gain antenna, based on the feed source 1 and the reflector 2, is provided with the metal director 4 nested with the dielectric director 3. Specifically, electromagnetic waves emitted by the antenna are reflected from the reflector 2 to form a highly directional beam, initially increasing antenna gain. Then, the beam is refracted through the metal director 4 and the dielectric director 3 to further form electromagnetic waves with high gain, achieving the goals of improving antenna impedance and increasing antenna gain. The dielectric director 3 in this embodiment has low cost, is easy to integrate and convenient to process, and facilitates combination with a product, thereby increasing a product coverage distance.

In a possible implementation, referring to FIG. 1 to FIG. 4, the first radiation unit 11 and the second radiation unit 12 of the feed source 1 are arranged in a crossed manner, and the first radiation unit 11 and the second radiation unit 12 form an intersection line. The dielectric director 3 with a cylindrical structure has an accommodating cavity, and the feed source 1 and the reflector 2 are both accommodated in the accommodating cavity, allowing reflected electromagnetic waves to reach the dielectric director 3 for refraction, further increasing antenna gain. The metal director 4 is annularly disposed on an inner surface of the dielectric director 3 to improve antenna impedance.

In some embodiments, the reflector 2 includes a first plate 21, a second plate 22, and a connecting plate 23, where the first plate 21 and the second plate 22 are arranged in parallel and connected to each other through the connecting plate 23, and the connecting plate 23 is perpendicular to the intersection line of the first radiation unit 11 and the second radiation unit 12.

In a possible implementation, referring to FIG. 1 to FIG. 4, the connecting plate 23 of the reflector 2 is perpendicular to the intersection line and is disposed underneath the feed source 1, so that electromagnetic waves emitted by the feed source 1 reach the reflector 2 and are reflected to form a highly directional beam, increasing antenna gain.

In some embodiments, each metal unit 41 includes a plurality of metal plates 411, and the plurality of metal plates 411 are arranged in parallel along the axial direction of the cylindrical structure.

Figure 4:
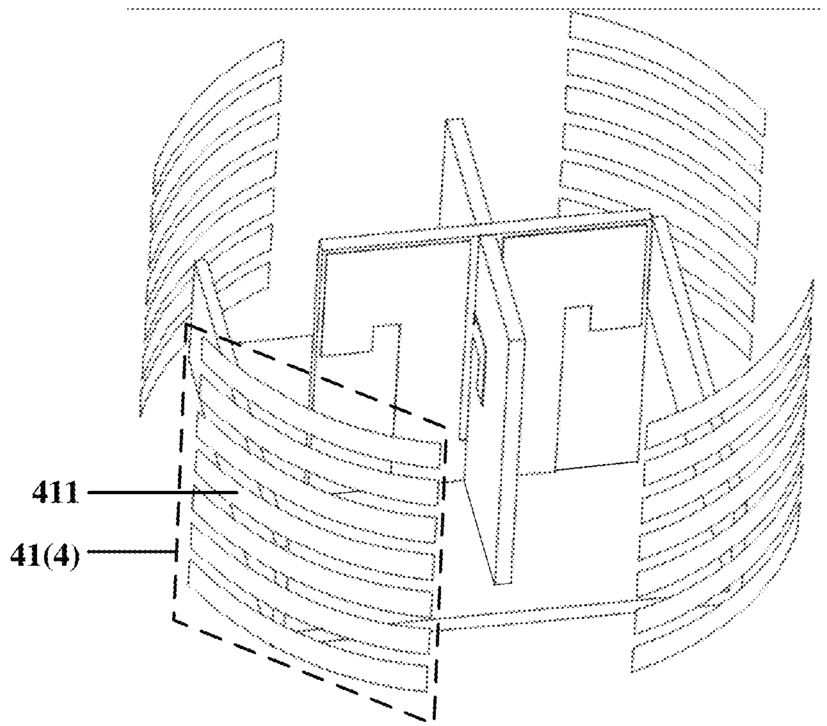
FIG. 4 is a schematic partial structural diagram of a gain antenna according to an embodiment of this application.

In a possible implementation, referring to FIG. 1 and FIG. 4, the metal plates 411 are elongated structures (for example, rectangular structures). As in an orientation shown in FIG. 1, the plurality of metal plates 411 in each metal unit 41 are arranged from top to bottom on an inner surface of the dielectric director 3. Uniform arrangement of the plurality of metal plates 411 facilitates refraction of electromagnetic waves in various directions, increasing antenna gain.

In some possible implementations, shapes of the plurality of metal plates 411 included in the metal unit 41 may be the same or different; for example, an elongated structure may be composed of multiple squares spliced together, and embodiments of this application impose no limitation on this.

In some embodiments, the first radiation unit 11 and the second radiation unit 12 form an included angle, the included angle includes a first included angle, and a magnitude of the first included angle ranges from 85° to 95°.

In a possible implementation, referring to FIG. 1, the first radiation unit 11 and the second radiation unit 12 form four included angles, two opposite angles among the four included angles are equal to one another, including two first included angles and two second included angles. A magnitude of the first included angle ranges from 85° to 95°. Exemplarily, the magnitude may be 85°, 86°, 87°, 88°, 89°, 90°, 91°, 92°, 93°, 94°, or 95°. Correspondingly, a magnitude of the second included angle may be 95°, 94°, 93°, 92°, 91°, 90°, 89°, 88°, 87°, 86°, or 85°. As a special example, magnitudes of all four included angles are 90°. The included angle between the first radiation unit and the second radiation unit can be adjusted based on actual application conditions to achieve a better gain effect.

In some embodiments, a dimension of the connecting plate 23 is 2.6 cm*2.6 cm;

- and/or, a dimension of the first plate 21 along an axial direction of the dielectric director ranges from 0.5 cm to 1 cm;
- and/or, a dimension of the second plate 22 along an axial direction of the dielectric director ranges from 0.5 cm to 1 cm.

In a possible implementation, referring to FIG. 1, the connecting plate 23 is square-shaped, in the orientation shown in FIG. 1, a height of the first plate 21 ranges from 0.5 cm to 1 cm, exemplarily, the height may be 0.5 cm, 0.6 cm, 0.7 cm, 0.8 cm, 0.9 cm, or 1 cm. A height of the second plate 22 ranges from 0.5 cm to 1 cm, exemplarily, the height may be 0.5 cm, 0.6 cm, 0.7 cm, 0.8 cm, 0.9 cm, or 1 cm. Dimensions of the reflector 2 can be adjusted based on actual conditions to meet application requirements.

In some embodiments, a dielectric constant of the metal director 4 is a first fixed value, and a dielectric constant of the dielectric director 3 is a second fixed value.

In a possible implementation, the metal director 4 is a metal material with a single conductivity, and the dielectric constant of the dielectric director 3 is fixed. Exemplarily, the dielectric director 3 selects polytetrafluoroethylene with a dielectric constant of 1.6, and this material has advantages of low loss, fixed dielectric constant, low cost, good stability, and good processability. The dielectric director 3 in the embodiments of this application has a simple processing technology and stable material molding.

In some embodiments, a distance from a geometric center of the feed source 1 to an inner surface of the dielectric director 3 along a direction perpendicular to the axis of the cylindrical structure ranges from 0.2λ to 2.8λ, where λ=1/f, and f is a frequency of the gain antenna;

- and/or, a thickness of the dielectric director 3 ranges from 0.292 to 0.32, where 2=1/f, and f is a frequency of the gain antenna;
- and/or, a distance from a geometric center of the feed source 1 to an outer surface of the dielectric director 3 ranges from 0.49λ to 3.1λ, where λ=1/f, f is a frequency of the gain antenna;
- and/or, a height of the dielectric director 3 along the axial direction is greater than a height of the feed source 1 along the axial direction.

In a possible implementation, referring to FIG. 1, an inner diameter of the dielectric director 3 ranges from 0.22 to 2.82, exemplarily, the inner diameter may be 0.2λ, 0.4λ, 0.6λ, 0.8λ, 1.0λ, 1.2λ, 1.4λ, 1.6λ, 1.8λ, 2.0λ, 2.2λ, 2.4λ, 2.6λ, or 2.8λ. A thickness of the dielectric director 3 ranges from 0.29λ to 0.3λ, exemplarily, the thickness may be 0.292λ, 0.294λ, 0.296λ, 0.298λ, or 0.3λ. An outer diameter of the dielectric director 3 ranges from 0.49λ to 3.1λ, exemplarily, the outer diameter may be 0.49λ, 0.6λ, 0.8λ, 1.0λ, 1.2λ, 1.4λ, 1.6λ, 1.8λ, 2.2λ, 2.2λ, 2.4λ, 2.6λ, 2.8λ, or 3.1λ. A height of the dielectric director 3 ranges from 0.5λ to 2.9λ, exemplarily, the height may be 0.5λ, 0.7λ, 0.9λ, 1.1λ, 1.3λ, 1.5λ, 1.7λ, 1.9λ, 2.1λ, 2.3λ, 2.5λ, 2.7λ, or 2.9λ, where λ=1/f, f is a frequency of the gain antenna, and A is a wavelength of the gain antenna. This application optimizes specifications and distribution parameters of various components through simulation verification, increasing antenna gain and improving antenna impedance.

In some embodiments, a cross-sectional shape of the dielectric director 3 is square.

Figure 5:
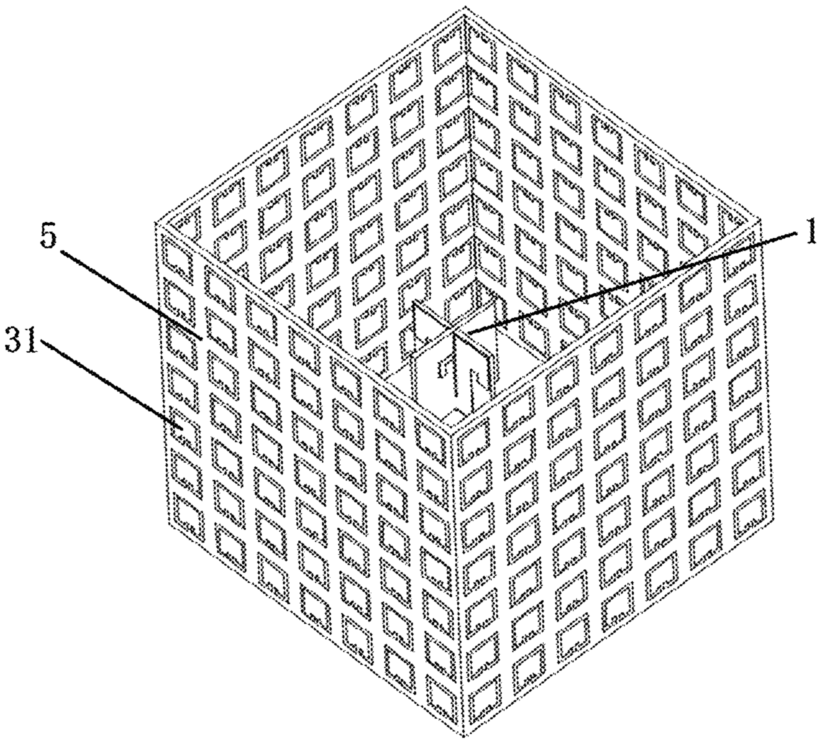
FIG. 5 is a schematic structural diagram of another gain antenna according to an embodiment of this application.

In a possible implementation, referring to FIG. 5, a cross-section of the dielectric director 3 may be square, and a shape of the dielectric director 3 may be a cubic shape.

In some embodiments, an outer surface of the dielectric director 3 is provided with a plurality of split-ring resonator structures 31, and a spacing between any two adjacent split-ring resonator structures 31 is equal to one another.

In a possible implementation, referring to FIG. 5, an embodiment of this application provides a dielectric director 3 with a square cross-section and a periodic structure, where one director assembly 5 is provided. As shown in FIG. 5, split-ring resonator structures 31 are arranged in a crossed manner on an outer surface of the dielectric director 3 to form a dielectric director 3 with a periodic structure. As shown in FIG. 5, the split-ring resonators 31 are arranged in rows and columns, where a distance between geometric centers of two adjacent split-ring resonator structures 31 in the same row on the same plane may be 0.3λ, that is, a period of the split-ring resonator is 0.3λ, a dimension of the dielectric director 3 is 2.1λ *2.1λ *2.1λ, and a vertical distance from a geometric center of the feed source 1 to an inner surface of the dielectric director 3 ranges from 0.8λ to 0.9λ, exemplarily, the distance may be 0.82λ, 0.84λ, 0.86λ, 0.88λ, or 0.9λ.

An equivalent relative dielectric constant of the dielectric director 3 within a bandwidth range is close to 0, thus its refractive index is also close to 0. According to the Snell's law of refraction, spherical waves emitted by the feed source 1 are refracted at a surface of the dielectric director 3 into plane waves, enabling conversion from spherical waves to plane waves over a short distance, thereby increasing antenna gain. The dielectric director 3 designed in this way is suitable for various types of feed sources 1, reducing the costs of repeated designs. In addition, compared to a Luneburg lens, the dielectric director 3 can achieve an electromagnetic wave conversion effect by using a surface treatment process of a printed circuit board (Printed Circuits Board, abbreviated as PCB), and a material with a dielectric constant ranging from 2.2 to 3.5 can be selected, exemplarily, the dielectric constant may be 2.2, 2.3, 2.4, 2.5, 2.6, 2.7, 2.8, 2.9, 3.0, 3.1, 3.2, 3.3, 3.4, 3.5, or the like. The dielectric director 3 has advantages of processing simplicity and low cost. This solution can be used as a complete antenna unit and is applicable to household wireless devices such as routers.

In some embodiments, a cross-sectional shape of the dielectric director 3 is circular.

In a possible implementation, referring to FIG. 1, a cross-section of the dielectric director 3 may be circular. In this case, an inner diameter of the dielectric director 3 ranges from 0.2λ to 0.25λ, exemplarily, the inner diameter may be 0.2λ, 0.21λ, 0.22λ, 0.23λ, 0.24λ, or 0.25λ. An outer diameter of the dielectric director 3 ranges from 0.49λ to 0.55λ, exemplarily, the outer diameter may be 0.49λ, 0.50λ, 0.51λ, 0.52λ, 0.53λ, 0.54λ, or 0.55λ. A thickness of the dielectric director 3 ranges from 0.29λ to 0.3λ, exemplarily, the thickness may be 0.292λ, 0.294λ, 0.296λ, 0.298λ, or 0.3λ. A height of the dielectric director 3 ranges from 0.5λ to 0.75λ, exemplarily, the height may be 0.5λ, 0.55λ, 0.6λ, 0.65λ, 0.7λ, or 0.75λ, where λ=1/f, f is a frequency of the gain antenna, and λ is a wavelength of the gain antenna.

Figure 3:
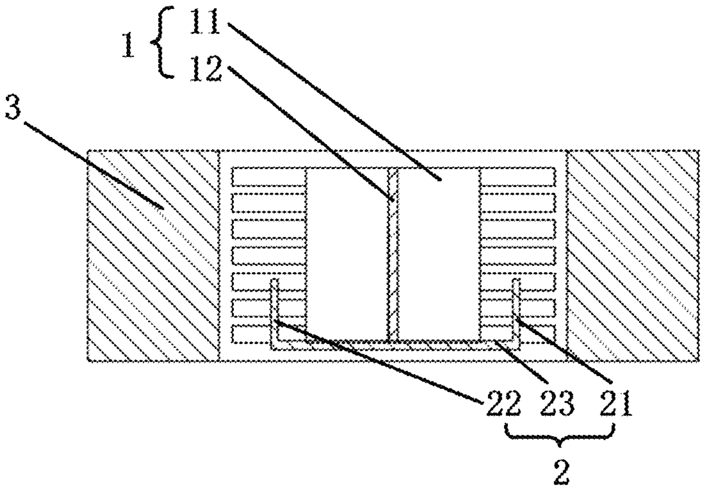
FIG. 3 is a schematic structural front view of a gain antenna according to an embodiment of this application.

In some embodiments, an outer surface of the dielectric director 3 is provided with a plurality of microstrip structures 32 in different sizes. In a possible implementation, referring to FIG. 6, an embodiment of this application provides a dielectric director 3 with a circular cross-section, and one director assembly 5. Specifically, as shown in FIG. 3, an outer surface of the dielectric director 3 is provided with a plurality of microstrip structures 32 of different sizes and shapes, thereby forming a dielectric director 3 with a non-periodic structure. A spacing between two adjacent microstrip structures 32 may be 0.26λ, a radius of the dielectric director 3 is 2.8λ, a height of the dielectric director 3 is 2.9λ, and a vertical distance from a geometric center of the feed source 1 to an inner surface of the dielectric director 3 is 2.8λ.

The microstrip structures 32 in different sizes can achieve different phase shifts in electromagnetic waves. Based on phase differences caused by different paths reaching the dielectric director 3, a phase compensation formula can be calculated to determine a size of the microstrip structure 32 at each position. When each path of electromagnetic waves achieves the same phase through phase compensation, spherical waves emitted by the feed source 1 are converted into plane waves, increasing gain.

This solution primarily increases gain through phase compensation. The first radiation unit 11 and the second radiation unit 12 of the feed source 1 are arranged in a crossed manner, and a space between the feed source 1 and the dielectric director 3 is divided into four areas. In this way, the dielectric director 3 with the non-periodic structure is also divided into four areas, enabling beam controls in four directions. Angles of the four areas add up to 360°, forming a circular plane. An internal space of the dielectric director 3 is also a circular plane. The two circular planes adopt a conformal design, which can reduce volume and increase design freedom. A material with a dielectric constant ranging from 2.2 to 3.5 can be selected, exemplarily, the dielectric constant may be 2.2, 2.3, 2.4, 2.5, 2.6, 2.7, 2.8, 2.9, 3.0, 3.1, 3.2, 3.3, 3.4, 3.5, or the like. The dielectric director 3 can achieve the effect of increasing antenna gain by using the surface treatment process of the printed circuit board (Printed Circuits Board, abbreviated as PCB), with the advantages of processing simplicity and low cost. This solution can be used as a complete antenna unit and is applicable to household wireless devices such as routers.

In some embodiments, the dielectric director 3 and the metal director 4 form a director assembly 5, the gain antenna includes a plurality of director assemblies 5, and the plurality of director assemblies are arranged at intervals along a direction perpendicular to an axis of the dielectric director 3; and a spacing between any two adjacent director assemblies 5 along a direction perpendicular to the axis of the dielectric director 3 is equal to one another.

Figure 7:
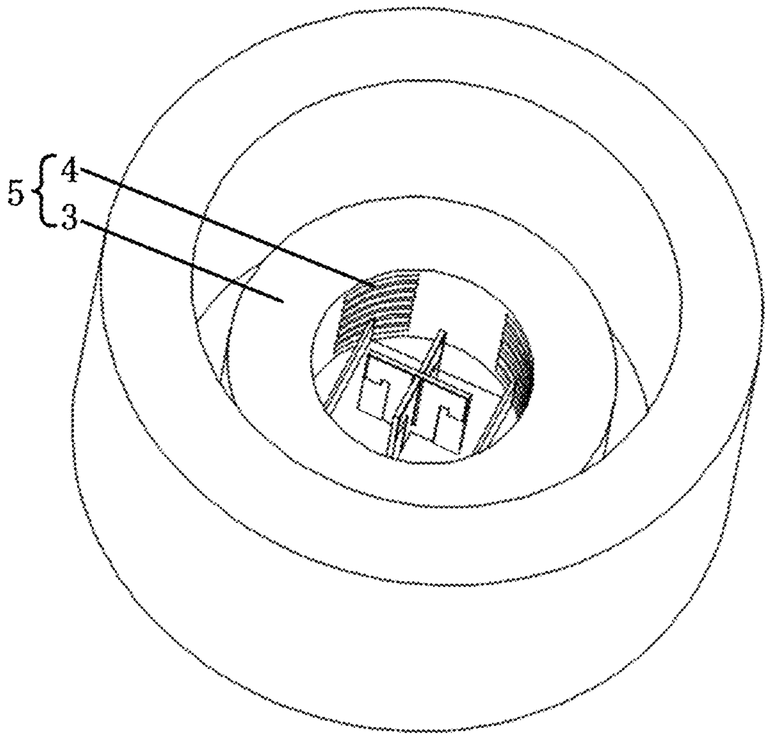
FIG. 7 is a schematic structural diagram of a gain antenna according to an embodiment of this application.
Figure 8:
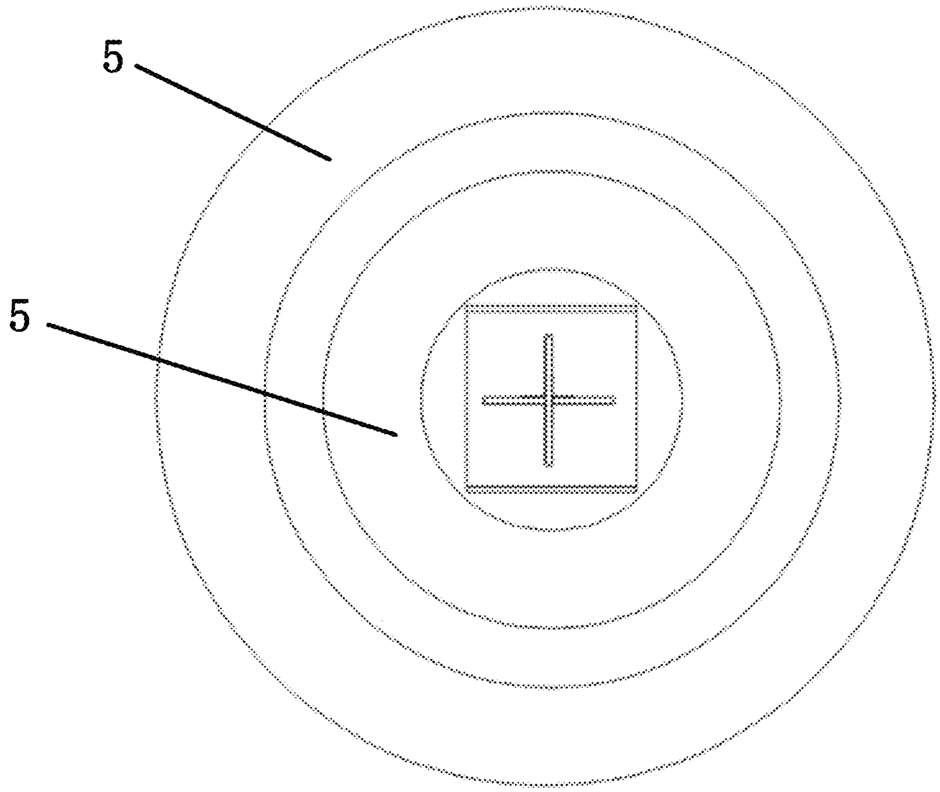
FIG. 8 is a schematic structural top view of a gain antenna according to an embodiment of this application.
Figure 9:
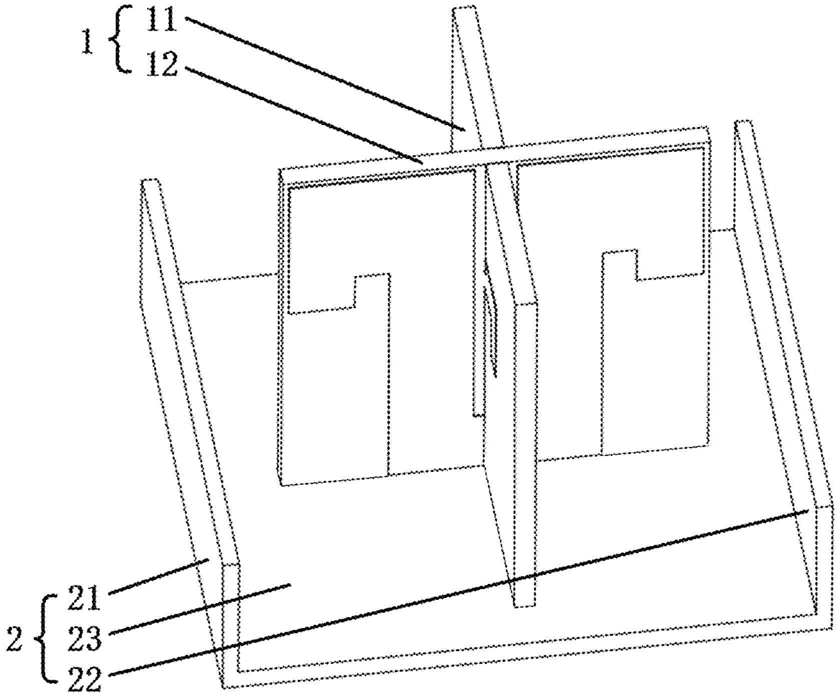
FIG. 9 is a schematic structural diagram of an independent feed source according to an embodiment of this application.

In a possible implementation, referring to FIG. 7 and FIG. 8, the dielectric director 3 and the metal director 4 are combined into one whole part to form a director assembly 5. There are two director assemblies 5 in FIG. 7, and a height of a second director assembly 5 is greater than a height of a first director assembly 5. A beam passing through the first director assembly 5 and a beam not reflected from the first director assembly 5 can be reflected. When there are no constraints on the external dimensions of the antenna, in principle, a plurality of director assemblies 5 can be placed at positions with equal spacings based on actual needs, where the spacing may be 0.15λ; alternatively, the director assemblies 5 may be arranged at unequal spacings. The embodiments of this application impose no limitation on this. That is to say, the director assembly 5 can be modularly designed and used, and can serve as an independent expansion unit to meet antenna size requirements. As the number of director assemblies 5 increases, antenna gain can be further increased.

Embodiments of this application further provide a communication device including the gain antenna described above. Since the communication device includes all technical features of the gain antenna, the communication device also includes all beneficial effects of the gain antenna, which are not repeated here.

To further illustrate this application, a gain antenna provided by this application is described in detail below in conjunction with specific embodiments.

Figure 10:
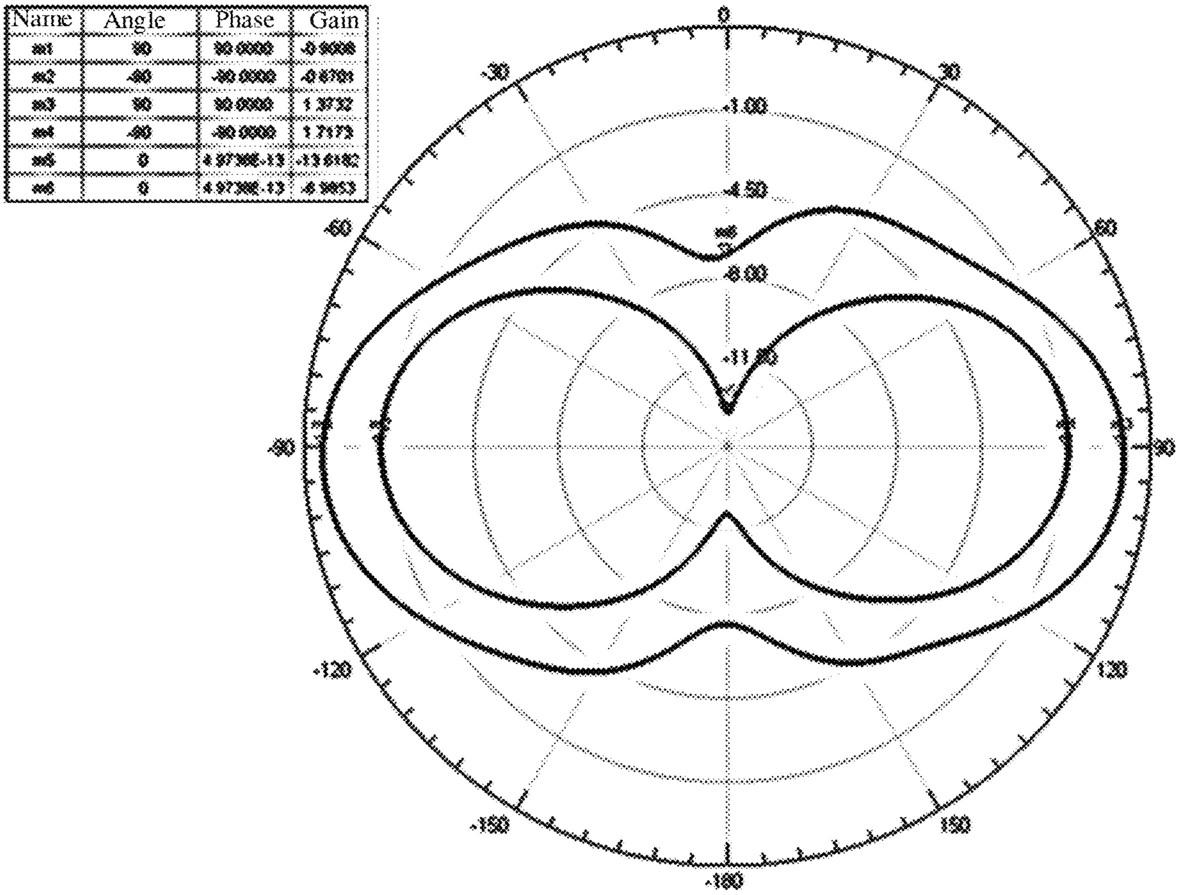
FIG. 10 is a data comparison chart of a gain antenna according to an embodiment of this application.

FIG. 1 provides a gain antenna with one director assembly 5. As shown in FIG. 1, compared to an independent feed source 1 shown in FIG. 9, this embodiment can effectively increase antenna gain; and data comparison is shown in FIG. 10.

Taking a 5G frequency band as an example, with an independent feed source 1, a gain at m2 is 0.6 dBi; and after one director assembly 5 (including a metal director 4 and a dielectric director 3) is added, a gain at m4 is 1.7 dBi, with a gain increase of 2.3 dBi. This solution can be used as a complete antenna unit and is applicable to household wireless devices such as routers.

Figure 11:
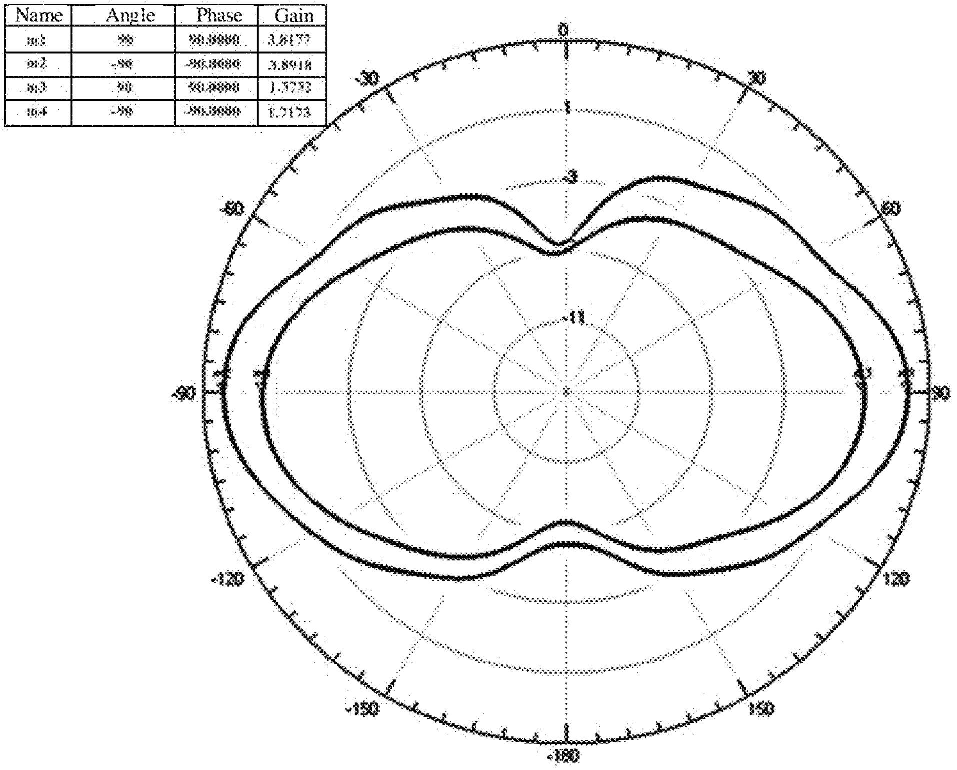
FIG. 11 is a data comparison chart of a gain antenna according to an embodiment of this application.

FIG. 7 provides a gain antenna with two director assemblies 5. As compared with the embodiment shown in FIG. 1, in the embodiment shown in FIG. 7, two director assemblies 5 are added, so that antenna gain can be further increased; and data comparison is shown in FIG. 11.

Taking a 5G frequency band as an example, after one director assembly 5 is added, a gain at m4 is 1.7 dBi; and after two director assemblies 5 are added, a gain at m2 is 3.89 dBi, with a gain increase of 2.19 dBi.

Figure 12:
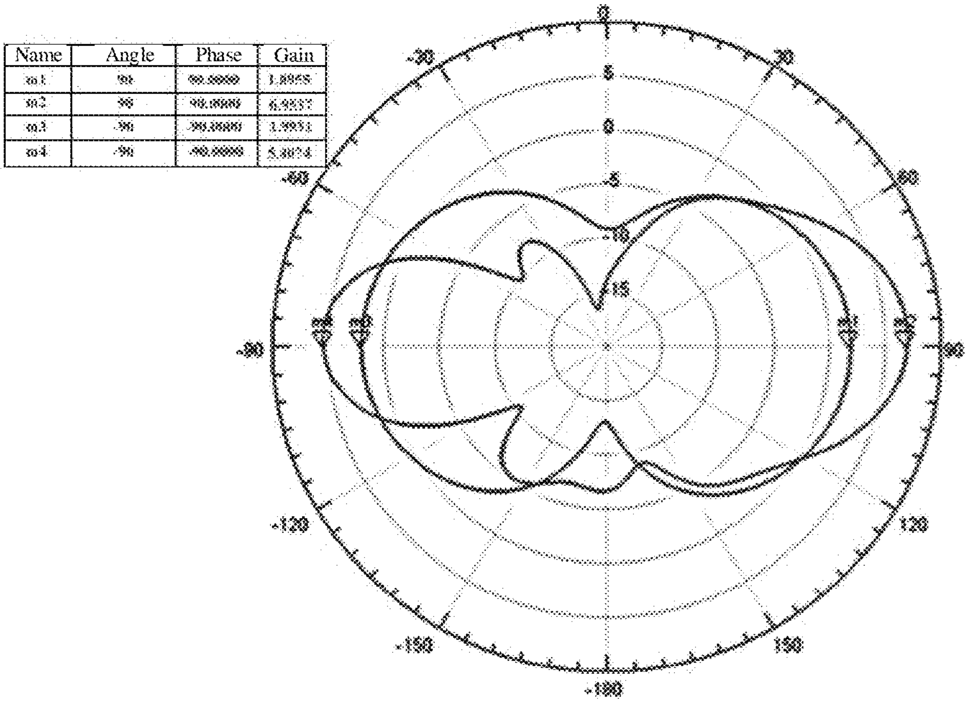
FIG. 12 is a data comparison chart of a gain antenna according to an embodiment of this application.

FIG. 5 provides a dielectric director 3 with a square cross-section and a periodic structure, as shown in FIG. 5, one director assembly 5 is provided, and data comparison before and after the dielectric director 3 with the periodic structure is added is shown in FIG. 12.

Taking a 5G frequency band as an example, before the dielectric director 3 with the periodic structure is added, a gain at m1 is 1.9 dBi; and after the dielectric director 3 with the periodic structure is added, a gain at m2 is 6.96 dBi, with a gain increase of 5.06 dBi.

Figure 6:
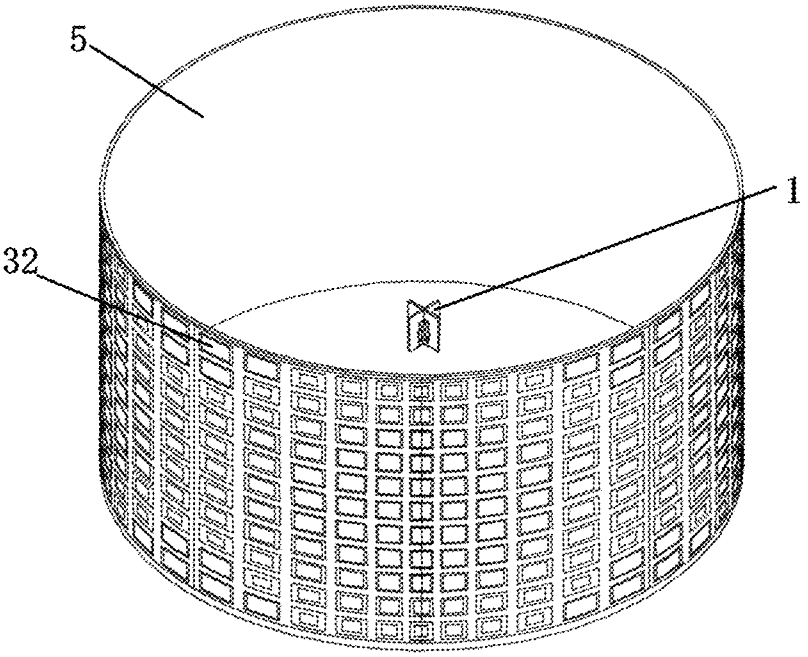
FIG. 6 is a schematic structural diagram of another gain antenna according to an embodiment of this application.
Figure 13:
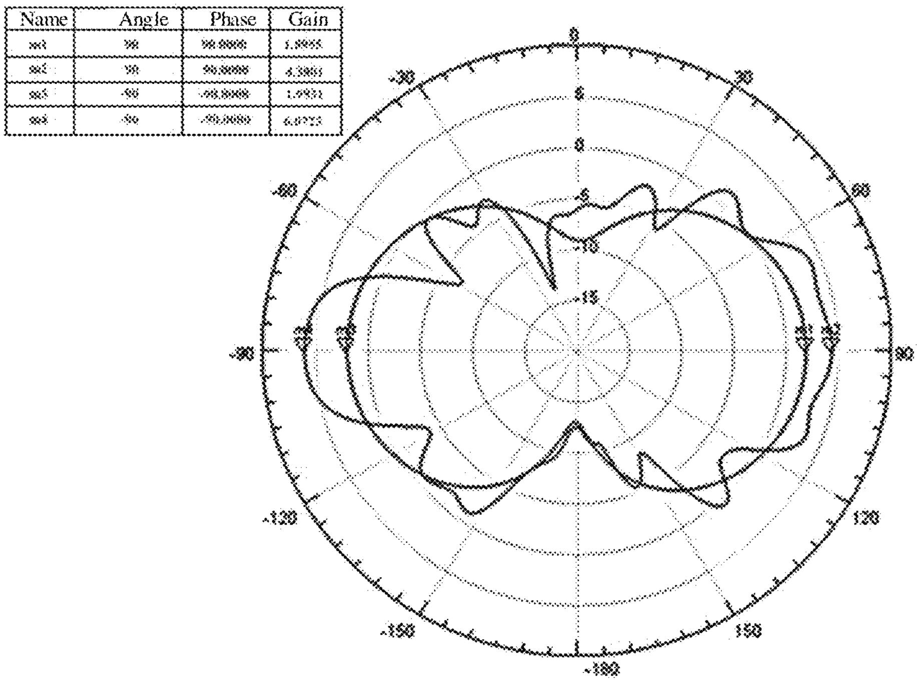
FIG. 13 is a data comparison chart of a gain antenna according to an embodiment of this application.

FIG. 6 provides a dielectric director 3 with a circular cross-section and a non-periodic structure, as shown in FIG. 6, one director assembly 5 is provided, and data comparison before and after the dielectric director 3 with the non-periodic structure is added is shown in FIG. 13.

Taking a 5G frequency band as an example, before the dielectric director 3 with the non-periodic structure is added, a gain at m3 is 1.99 dBi; and after the dielectric director 3 with the non-periodic structure is added, a gain at m4 is 6.07 dBi, with a gain increase of 4.08 dBi.

In summary, based on the independent feed source 1, addition of the metal director 4 and the dielectric director 3 can effectively improve antenna impedance and increase antenna gain; and designing the periodic structure or the non-periodic structure of the dielectric director 3 can achieve the effect of further increasing antenna gain.

Apparently, persons skilled in the art can make various modifications and variations to this application without departing from the spirit and scope of this application. Thus, if these modifications and variations of this application fall within the scope of the claims of this application and their equivalent technologies, this application is also intended to include these modifications and variations.

What is claimed is:

1. A gain antenna, comprising: a feed source, a reflector, a dielectric director, and a metal director; wherein the feed source comprises a first radiation unit and a second radiation unit, and the first radiation unit and the second radiation unit are arranged in a crossed manner;

the dielectric director comprises a cavity structure, the feed source and the reflector are disposed inside the cavity structure, an axial direction of the cavity structure coincides with an intersection line of the feed source, and the intersection line of the feed source is an intersection line formed by the first radiation unit and the second radiation unit arranged in the crossed manner; and the metal director comprises a plurality of metal units, and the plurality of metal units are disposed on an inner surface of the cavity structure and peripherally arranged around an axis of the cavity structure.

2. The gain antenna according to claim 1, wherein the cavity structure of the dielectric director is a cylindrical structure, the feed source and the reflector are disposed inside the cylindrical structure, and an axial direction of the cylindrical structure coincides with the intersection line; and the plurality of metal units of the metal director are disposed on an inner surface of the cylindrical structure and peripherally arranged around an axis of the cylindrical structure.

3. The gain antenna according to claim 2, wherein each metal unit comprises a plurality of metal plates, and the plurality of metal plates are arranged in parallel along the axial direction of the cylindrical structure.

4. The gain antenna according to claim 3, wherein the metal plates are elongated structures.

5. The gain antenna according to claim 2, wherein the first radiation unit and the second radiation unit intersect to form an included angle, the included angle comprises a first included angle, and a magnitude of the first included angle ranges from 85° to 95°.

6. The gain antenna according to claim 2, wherein a thickness of the dielectric director along a direction perpendicular to the axis of the cylindrical structure ranges from 0.29λ to 0.3λ, wherein λ=1/f, and f is a frequency of the gain antenna.

7. The gain antenna according to claim 6, wherein a distance from a geometric center of the feed source to an inner surface of the dielectric director along the direction perpendicular to the axis of the cylindrical structure ranges from 0.2λ to 2.8λ, wherein λ=1/f, and f is the frequency of the gain antenna.

8. The gain antenna according to claim 6, wherein a distance from a geometric center of the feed source to an outer surface of the dielectric director along the direction perpendicular to the axis of the cylindrical structure ranges from 0.49λ to 3.1λ, wherein λ=1/f, and f is the frequency of the gain antenna.

9. The gain antenna according to claim 1, wherein a dielectric constant of the metal director is a first fixed value, and a dielectric constant of the dielectric director is a second fixed value.

10. The gain antenna according to claim 1, wherein a cross-sectional shape of the dielectric director is circular.

11. The gain antenna according to claim 1, wherein an outer surface of the dielectric director is provided with a plurality of microstrip structures in different sizes.

12. The gain antenna according to claim 1, wherein a cross-sectional shape of the dielectric director is square, and the cavity structure of the dielectric director is a cubic structure.

13. The gain antenna according to claim 12, wherein an outer surface of the dielectric director is provided with a plurality of split-ring resonator structures.

14. The gain antenna according to claim 13, wherein a spacing between two adjacent split-ring resonator structures is equal to one another.

15. The gain antenna according to claim 1, wherein a height of the dielectric director along the axial direction is greater than a height of the feed source along the axial direction.

16. The gain antenna according to claim 1, wherein the dielectric director and the metal director form a director assembly.

17. The gain antenna according to claim 16, further comprising a plurality of director assemblies, and the plurality of director assemblies are arranged at intervals along a direction perpendicular to an axis of the dielectric director.

18. The gain antenna according to claim 16, wherein a spacing between two adjacent director assemblies along a direction perpendicular to an axis of the dielectric director is equal to one another.

19. A communication device, comprising the gain antenna according to claim 1.

* * * * *